United States Patent
Piro et al.

(10) Patent No.: US 12,492,318 B2
(45) Date of Patent: Dec. 9, 2025

(54) TEMPERATURE-STABILIZATION OF CONVERTIBLE FUNCTIONAL INKS BY DISRUPTION OF CONDUCTION PATHS

(71) Applicants: Raytheon Company, Waltham, MA (US); The University of Massachusetts, Lowell, MA (US)

(72) Inventors: Yuri Piro, Boston, MA (US); Oshadha Ranasingha, Salem, NH (US); Andrew M. Luce, Marlborough, MA (US); Edward D. Kingsley, Stow, MA (US); Alkim Akyurtlu, Arlington, MA (US); Craig A. Armiento, Acton, MA (US)

(73) Assignees: RAYTHEON COMPANY, Waltham, MA (US); THE UNIVERSITY OF MASSACHUSETTS, Lowell, MA (US)

(*) Notice: Subject to any disclaimer, the term of this patent is extended or adjusted under 35 U.S.C. 154(b) by 614 days.

(21) Appl. No.: 17/938,688

(22) Filed: Oct. 7, 2022

(65) Prior Publication Data

US 2023/0113929 A1 Apr. 13, 2023

Related U.S. Application Data

(60) Provisional application No. 63/254,230, filed on Oct. 11, 2021.

(51) Int. Cl.
C09D 11/00 (2014.01)
C09D 11/107 (2014.01)
C09D 11/52 (2014.01)
C09D 11/54 (2014.01)

(52) U.S. Cl.
CPC ............ C09D 11/54 (2013.01); C09D 11/107 (2013.01); C09D 11/52 (2013.01)

(58) Field of Classification Search
CPC ........ C09D 11/54; C09D 11/107; C09D 11/52
USPC ....................... 106/31.01, 31.13, 31.6, 31.92
See application file for complete search history.

(56) References Cited

U.S. PATENT DOCUMENTS

| | | | |
|---|---|---|---|
| 2017/0009090 A1* | 1/2017 | Haghzadeh | H05K 1/16 |
| 2020/0148905 A1* | 5/2020 | Ranasingha | C09D 11/037 |
| 2022/0220331 A1 | 7/2022 | Ranasingha et al. | |

FOREIGN PATENT DOCUMENTS

| | | |
|---|---|---|
| EP | 3065151 A1 | 9/2016 |
| JP | 2003128959 A | 5/2003 |
| JP | 2012094508 A | 5/2012 |
| JP | 2013195733 A | 9/2013 |
| JP | 2019192475 A | 10/2019 |

(Continued)

OTHER PUBLICATIONS

Ranasingha et al. "Selective laser sintering of conductive patterns on a novel silver-barium strontium titanate composite material." Flexible and Printed Electronics 5.4 (2020): 045007. 10 pages.

(Continued)

*Primary Examiner* — James E McDonough
(74) *Attorney, Agent, or Firm* — CANTOR COLBURN LLP

(57) ABSTRACT

An ink stabilizing composition includes a polymeric network including an acrylate polymer and a plurality of high aspect ratio particles each having an aspect ratio of about 2:1 to about 30:1 and an average particle diameter of about 0.5 to about 1.2 micrometers.

7 Claims, 4 Drawing Sheets

(56) References Cited

FOREIGN PATENT DOCUMENTS

| WO | 2012135551 A1 | 10/2012 |
| WO | 2018034117 A1 | 2/2018 |
| WO | 2019203178 A1 | 10/2019 |
| WO | 2021022024 A1 | 2/2021 |

OTHER PUBLICATIONS

Sivaramakrishnan et al. "Controlled insulator-to-metal transformation in printable polymer composites with nanometal clusters." Nature materials 6.2 (2007): 149-155.
PCT International Preliminary Report on Patentability for PCT Application No. PCT/US2022/046255, dated Apr. 25, 2024, 7 pages.
International Search Report and Written Opinion for PCT Application No. PCT/US2022/046255, dated Feb. 6, 2023, pp. 1-12.
JP Office Action with English Translation for Patent Application No. 2024-521840, mailed Mar. 18, 2025, 10 pages.

* cited by examiner

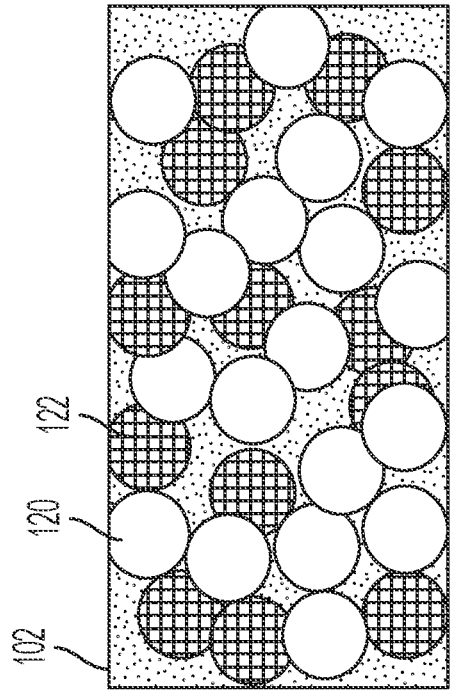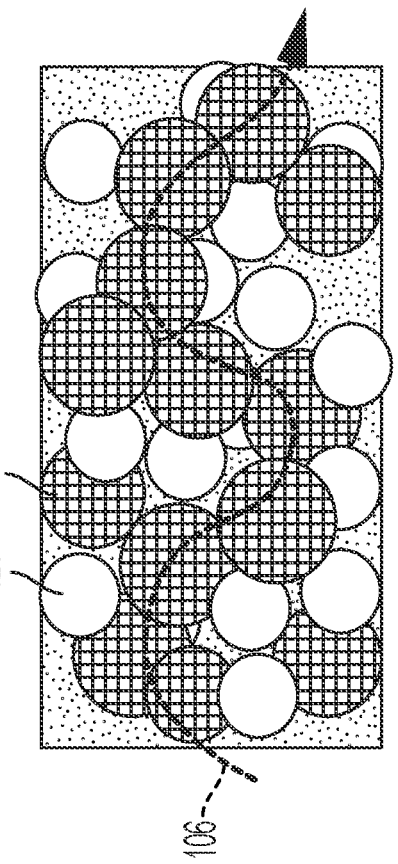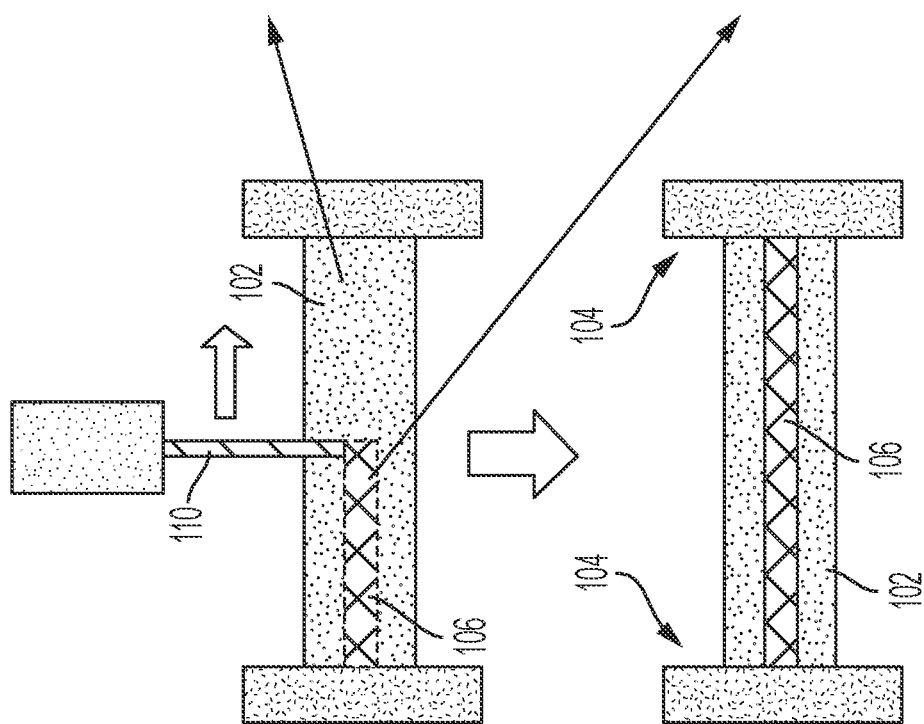

TEMPERATURE-STABILIZATION OF CONVERTIBLE FUNCTIONAL INKS BY DISRUPTION OF CONDUCTION PATHS

CROSS-REFERENCE TO RELATED APPLICATION

This application which claims priority to U.S. Provisional Patent Application No. 63/254,230, filed Oct. 11, 2021, which is incorporated by reference herein in its entirety.

BACKGROUND

The present disclosure relates to convertible inks, and more specifically, to temperature-stabilization of convertible inks.

Convertible inks can be used to fabricate electronic structures. Examples of convertible inks include composite materials with an insulating or dielectric phase after curing but which can be selectively converted to a conductive or resistive phase by methods such as a thermal treatment or laser sintering.

SUMMARY

According to one or more embodiments, an ink stabilizing composition includes a polymeric network including an acrylate polymer and a plurality of high aspect ratio particles each having an aspect ratio of about 2:1 to about 30:1 and an average particle diameter of about 0.5 to about 1.2 micrometers.

According to other embodiments, a stabilized ink includes a plurality of conductive particles, a plurality of insulating particles, a plurality of high aspect ratio stabilizing particles, and a polymer in voids between the plurality of conductive particles and the plurality of insulating particles. The stabilized ink is in an insulating phase.

Yet, according to some embodiments, a method of stabilizing a convertible ink includes disposing a stabilizing material on a convertible ink. The stabilizing material includes a polymeric network and a plurality of high aspect ratio particles each having an aspect ratio of about 2:1 to about 30:1 and an average particle diameter of about 0.5 to about 1.2 micrometers. The convertible ink includes a plurality of conductive particles and a plurality of insulating particles.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts:

FIG. 1A is a laser sintering method for converting dielectric portions of a convertible ink to conductive portions;

FIG. 1B is an expanded view of dielectric portions of the convertible ink;

FIG. 1C is an expanded view of a conductive path of the convertible ink after laser sintering;

DETAILED DESCRIPTION

Figure 2B:
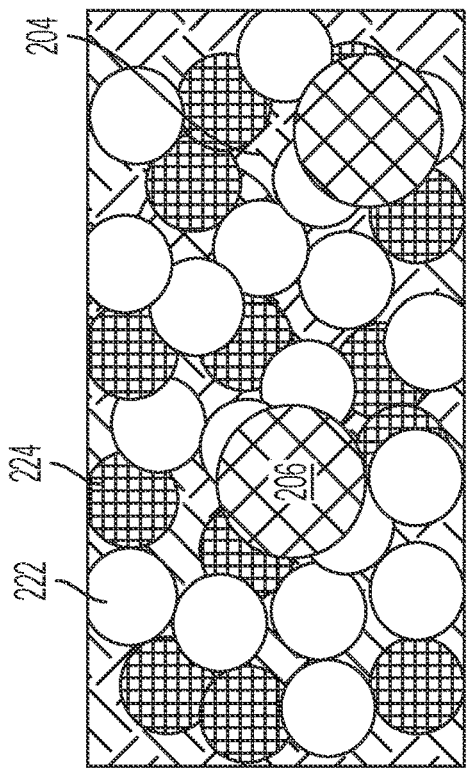
FIG. 2B shows the convertible ink after applying a stabilizing material layer.

Convertible inks are composite materials with an insulating or dielectric phase after being cured but which are selectively converted to a conductive or resistive phase by methods such as a thermal treatment or laser sintering. Convertible inks can include, for example, a composite blend of conductive particles and insulating particles. A non-limiting example of a convertible ink includes conductive metal nanoparticles (e.g., silver) and insulating nanoparticles (e.g., barium strontium titanate), blended in a ratio such that the ink includes an insulating phase after curing but provides a conductive (and resistive) phase after higher temperature thermal treatment (e.g., a temperature greater than 125 degrees Celsius), such as by Selective Laser Sintering by an ultraviolet laser. Selective Laser Sintering can be performed using most lasers, but 400 to 450 nanometer (nm) wavelength lasers can provide optimal results. It is noted that the surface plasmon resonance of silver (Ag) nanoparticles is around 400 to 450 nm, and therefore, when silver is used in the convertible ink, exciting the surface plasmon resonance of the Ag nanoparticles will result in efficiently melting the silver nanoparticles due to the local heating generated by surface plasmon resonance excitation. Yet, other lasers, e.g., 830 nm lasers among others, are also suitable for sintering silver nanoparticles to form a conductive pattern. The laser wavelength used is tailored for the conductive nanoparticle. For example, when gold nanoparticles are used, a 532 nm laser may be used to excite the surface plasmon resonance of the gold. However, a laser of any wavelength may be used and tailored to the particular conductive nanoparticle.

For example, FIG. 1A shows a laser sintering method for converting dielectric portions of a convertible ink to conductive portions. After curing, the convertible ink is in an insulating phase. A laser 110 converts insulting portions 102 of a convertible ink to conductive portions 106. FIG. 1B is an expanded view of the dielectric portions 102 of the convertible ink, which includes a blend of conductive particles 122 and insulating particles 120. FIG. 1C is an expanded view of the conductive portion 106 showing how the conductive path of the convertible ink forms after laser sintering or thermal sintering, which causes the conductive particles 122 to fuse.

The convertible inks can be used as printable inks that are printed as films that can be easily patterned to create conductive traces by application of localized heat. After patterning the traces, however, it is desirable that insulating material remain in an insulating state. Yet, in some applications, subsequent thermal processes (e.g., soldering or other packaging processes) could unintentionally convert the desired patterns to a conductive state, thereby negating the patterning process.

Accordingly, described herein are stabilizing materials, and methods of making and using thereof, that introduce high aspect ratio particles and a three-dimensional polymer network into the convertible inks that prevent the formation of conductive paths in the films, even after thermal exposure, such as soldering or microelectronic packaging processes. The stabilizing materials can be used as a mask that is patterned to selectively define conductive traces within the dielectric portions of the convertible ink. As used herein, the term "convertible ink" and other like terms mean a composite of conductive and non-conductive particles that is converted from an insulator phase to a conductive/resistive phase by thermal sintering or laser sintering.

Figure 2C:
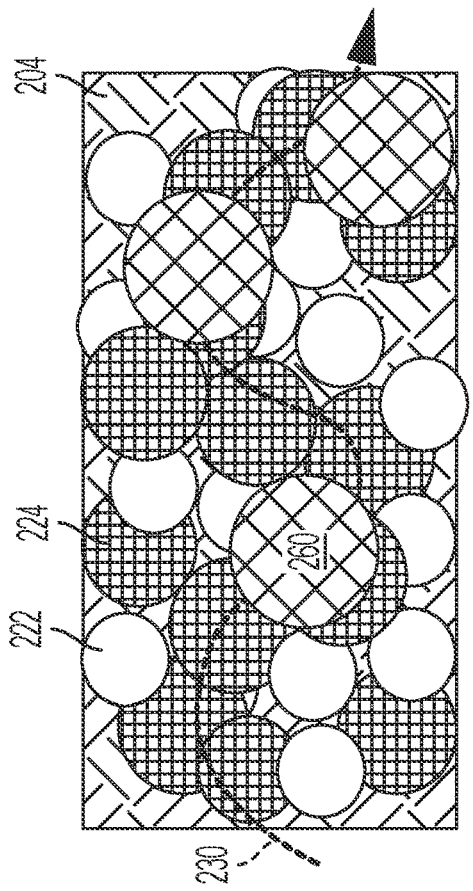
FIG. 2C shows disruption of the conductive path after applying the stabilizing material layer and laser sintering.
Figure 2A:
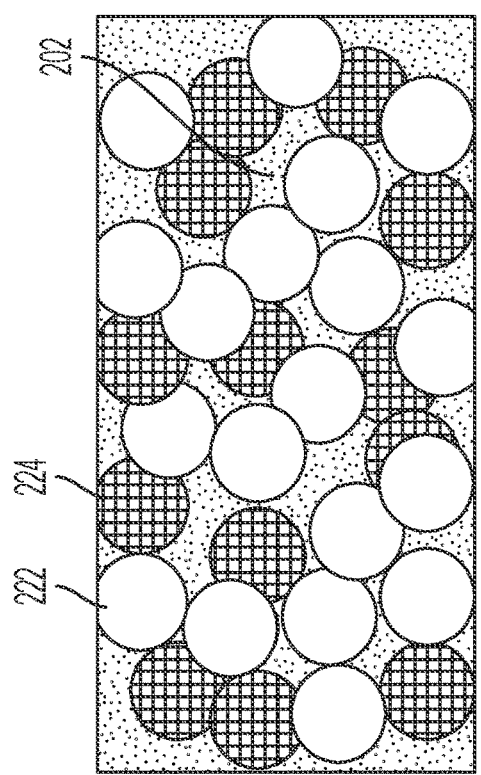
FIG. 2A shows dielectric portions of the convertible ink.

FIG. 2A shows dielectric portions of a convertible ink after curing and includes a blend of conductive particles 224 and insulating particles 222 with air gaps 202 therebetween. FIG. 2B shows the convertible ink after applying a stabilizing material layer to the convertible ink. The stabilizing layer includes a polymer 204 that fills the air gaps 202 in the convertible ink and high aspect ratio particles 260. FIG. 2C shows the convertible ink after thermal exposure, such as laser sintering or thermal sintering, and disruption of the conductive path 230 by the high aspect ratio particles 260. Both the polymer 204 and the high aspect ratio particles 260 are needed to prevent formation of the conductive path 230.

The conductive particles 224 in the convertible ink include conductive metal particles. Non-limiting examples of conductive metal particles include silver particles, gold particles, copper particles, or a combination thereof.

In one or more embodiments, the conductive particles 224 are in the convertible ink in an amount of about 55 to about 70 weight % (wt. %). In other embodiments, the conductive particles 224 are in the convertible ink in an amount of about 60 to about 65 wt. %. Yet, in some embodiments, the conductive particles 224 are in the convertible ink in an amount of about 62.5 wt. %.

In some embodiments, the average diameter of the conductive particles 224 is about 20 to about 200 nanometers (nm). In other embodiments, the average diameter of the conductive particles 224 is about 80 to about 120 nm. Yet, in some embodiments, the average diameter of the conductive particles 224 is about 100 nm. The average diameters of the conductive particles 224 and insulating particles 222 should be very close in order to see a homogeneous distribution after the curing.

The insulating particles 222 in the convertible ink include insulating (dielectric) materials or alloys. A non-limiting example of insulating particles 222 include barium strontium titanate particles. In one or more embodiments, the insulating particles 222 have a melting point of at least 700 degrees Celsius.

In some embodiments, the average diameter of the insulating particles 222 is about 20 to about 200 nanometers (nm). In other embodiments, the average diameter of the insulating particles 222 is about 80 to about 120 nm. Yet, in some embodiments, the average diameter of the insulating particles 222 is about 100 nm.

In one or more embodiments, the insulating particles 222 are in the convertible ink in an amount of about 30 to about 45 weight % (wt. %). In other embodiments, the insulating particles 222 are in the convertible ink in an amount of about 35 to about 40 wt. %. Yet, in some embodiments, the insulating particles 222 are in the convertible ink in an amount of about 37.5 wt. %.

According to one or more embodiments, the conductive particles 224 are silver particles, and the insulating particles 222 are barium strontium titanate particles.

To make the convertible ink, the conductive particles 224 and insulating particles 222 are combined in a solvent(s) and optionally, one or more additives. Non-limiting examples of solvents include 1-methoxy-2-propanol, ethylene glycol, or any combination thereof. In one or more embodiments, the solvent is a glycol solvent.

The mixture of conductive particles 224 and insulating particles 222 in the solvent(s) and optional additives is then cured by applying heat. After curing, the convertible ink remains in the insulating/dielectric phase and includes only the conductive particles 222 and insulating particles 224.

Curing is performed by, for example, heating for a period of time. The temperature and time for curing will depend on the composition of the convertible ink. According to one or more embodiments, curing is performed by heating at a temperature of about 75 to about 125 degrees Celsius. In other embodiments, curing is performed by heating at a temperature of about 80 to about 100 degrees Celsius.

Once the convertible ink is formed and cured, the stabilizing material layer is applied and cured with ultraviolet light.

The stabilizing layer includes a polymer 204 that fills the air gaps 202 in the convertible ink, as well as between high aspect ratio particles 260 (see FIG. 2B). FIG. 2C shows the convertible ink after thermal treatment, such as ultraviolet laser sintering, and disruption of the conductive path 230 by the high aspect ratio particles 260. The relatively large high aspect ratio particles 260 decrease the ratio of conductive particles 224 to insulating particles 222 in the initially cured convertible ink. The relatively large high aspect ratio particles 260 further disrupt the coalescence of the conductive particles 224 during the thermal sintering when the conductive path 230 is formed.

According to one or more embodiments, the high aspect ratio particles 260 are hexagonal boron nitride particles. In some embodiments, the high aspect ratio particles 260 have an aspect ratio of about 2:1 to about 30:1. In other embodiments, the high aspect ratio particles 260 have an aspect ratio of about 10:1 to about 20:1.

According to one or more embodiments, the high aspect ratio particles 260 have an average diameter of about 0.5 to about 1.2 micrometers. In other embodiments, the high aspect ratio particles 260 have an average diameter of about 0.8 to about 1.0 micrometers.

In one or more embodiments, the high aspect ratio particles 260 are in the stabilizing layer in an amount of about 5 to about 20 wt. %. In other embodiments, the high aspect ratio particles 260 are in the stabilizing layer in an amount of about 12 to about 15 wt. %.

According to one or more embodiments, the polymer 204 that fills the air gaps 202 in the convertible ink is an acrylate polymer. Other non-limiting examples of the polymer include trimethylolpropane ethoxylate triacrylate, urethane acrylate, epoxy acrylate, polyester acrylate, or any combination thereof. In some embodiments, the polymer 204 is a triacrylate polymer, which creates a strong three-dimensional polymeric network as a result of the three sites of unsaturation. The polymeric three-dimensional network created by the polymer 204 fills the air gaps 202 and minimizes the reflowing of the conductive particles 224.

The polymer 204 forming the three-dimensional network sustains high temperatures without decomposition. In some embodiments, the polymer 204 sustains a temperature of about 100 to about 250 degrees Celsius without decomposition. In other embodiments, the polymer 204 sustains a temperature of about 200 to about 225 without decomposition.

To form the stabilizing layer, one or more photoinitiators are combined with a polymer 204 precursor (i.e., oligomers and/or monomers), high aspect ratio particles 260, and optionally, one or more additives, such as one or more photoinitiators. When added, the one or more optional additive is added in an amount of about 0.25 to about 5 wt. %. The combination is mixed until agglomerations are no longer visible.

In one or more embodiments, the polymer precursor (e.g., oligomer and/or monomer) is in the stabilizing layer in an amount of about 70 to about 89 wt. %. In other embodiments, the polymer precursor (e.g., oligomer and/or monomer) is in the stabilizing layer in an amount of about 80 to about 85 wt. %.

Non-limiting examples of photoinitiators include 1-hydroxycyclohexyl phenyl ketone, phenylbis(2,4,6,7-trimethylbenzoyl) phospine oxide, 2-methyl-4'-(methylthio)-2-morpholinopropionphenone, benzophenone, 4-benzoyl-4'-methyldiphenylsulphide, benzyldimethylketal, 2-benzyle-2-dimethylamino-1-(4-morpholinophenyl)-1-butanoate, or any combination thereof.

The stabilizing material layer is applied to the surface of the convertible ink in the dielectric phase. Once applied, the stabilizing layer disrupts formation of a conductive path under thermal treatment that would otherwise convert the ink to a conductive phase (see FIG. 3).

Figure 4A:
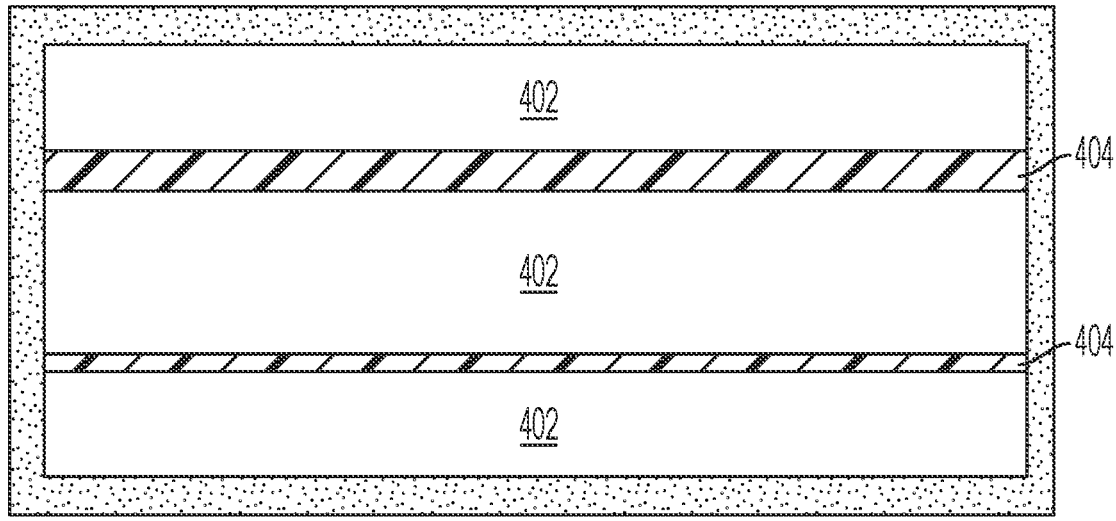
FIG. 4A is a top view of a patterned stabilizing layer on a convertible ink layer.
Figure 4B:
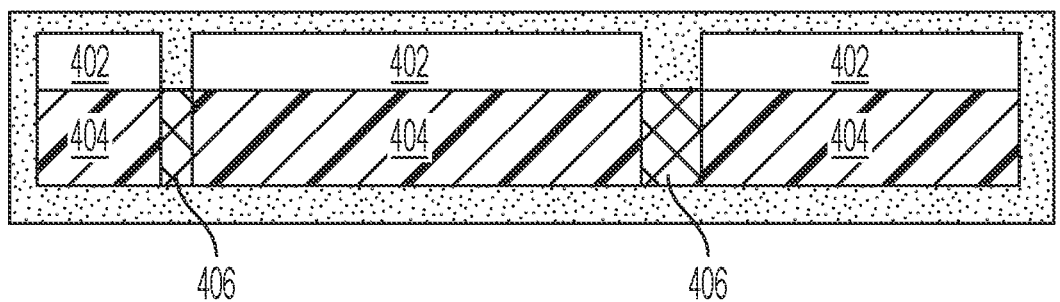
FIG. 4B is a side view of FIG. 4A.

The stabilizing layer is formed on the cured convertible ink layer. In some embodiments, the stabilizing layer is patterned as a mask. FIGS. 4A and 4B are top and side views, respectively, of a patterned stabilizing layer 402 on a convertible ink layer 404 in a cured dielectric phase. Once portions of the stabilizing layer 402 have been removed to expose select portions of the convertible ink below, the uncovered portions are selectively thermally treated, for example, by laser sintering, to form select conductive portions 406. The stabilizing layer 402 protects the unexposed portions of the convertible ink layer 404.

EXAMPLES

Example 1: Stabilizing Layer Formulations

Examples of stabilizing layer formulations are provided below in Table 1.

TABLE 1

Stabilizing layer formulations

| Component | Type | Formulation 1 | Formulation 2 |
|---|---|---|---|
| 1-hydroxycyclohexyl phenyl ketone | Photoinitiator | 0.28% | 0.28% |
| phenylbis (2,4,6,7-trimethylbenzoyl) phospine oxide | Photoinitiator | 0.28% | 0.28% |
| 2-methyl-4'-(methylthio)-2-morpholino-propionphenone | Photoinitiator | 0.28% | 0.28% |
| H-boron nitride | Inorganic filler | 15.50% | 15.50% |
| CN131 | Epoxy acrylate oligomer | — | 83.66% |
| Polypropylene glycol diacrylate | Diacrylate oligomer | 83.66% | — |

The oligomer, boron nitride, and photoinitiators are placed in a glass jar covered in aluminum foil. The jar is then stirred for two hours, with ten second on-off cycles. The sample is checked every minute for agglomerations. If agglomerations are present, the mixture is hand mixed until broken. The final mixture should have no visible agglomerations.

Example 2: Change in Resistance Measurements

Figure 3:
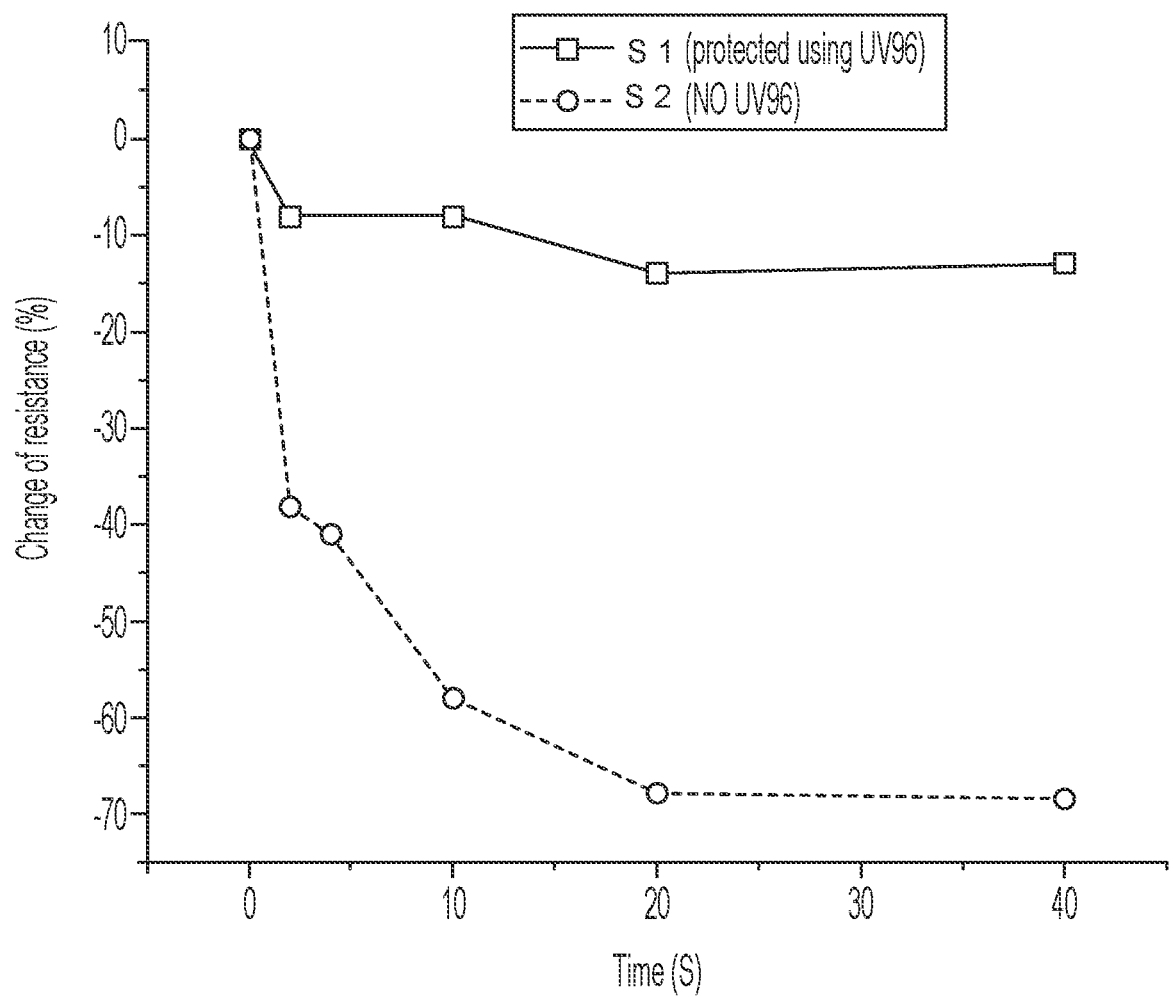
FIG. 3 is a graph showing the change in resistance of a convertible ink with and without a stabilizing layer.

Thermal stability testing of a convertible ink of silver-barium strontium titanate was conducted. The convertible ink was laser sintered, and FIG. 3 is a graph showing the change in resistance of the convertible ink with and without a stabilizing material layer. When the convertible ink was protected with a stabilizing layer (UV96), the resistance did not significantly change. However, without the stabilizing layer, the measured resistance changed significantly, indicating that the insulating material was entirely converted to a conductor.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description hereinafter, the terms "upper," "lower," "right," "left," "vertical," "horizontal," "top," "bottom," and derivatives thereof shall relate to the described structures and methods, as oriented in the drawing figures. The terms "overlying," "atop," "on top," "positioned on" or "positioned atop" mean that a first element, such as a first structure, is present on a second element, such as a second structure, wherein intervening elements such as an interface structure can be present between the first element and the second element. The term "direct contact" means that a first element, such as a first structure, and a second element, such as a second structure, are connected without any intermediary conducting, insulating or semiconductor layers at the interface of the two elements.

The terms "about," "substantially," "approximately," and variations thereof, are intended to include the degree of error associated with measurement of the particular quantity based upon the equipment available at the time of filing the application. For example, "about" can include a range of ±10%, 9%, 8%, 7%, 6%, or 5%, 4%, 3%, 2%, or 1% of a given value.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form detailed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the various embodiments with various modifications as are suited to the particular use contemplated.

While the preferred embodiments have been described, it will be understood that those skilled in the art, both now and in the future, may make various improvements and enhancements which fall within the scope of the claims which follow. These claims should be construed to maintain the proper protection for the disclosure as first described.

What is claimed is:

1. A stabilized ink comprising:
   a plurality of conductive particles;
   a plurality of insulating particles;
   a plurality of high aspect ratio stabilizing particles; and
   a polymer in voids between the plurality of conductive particles and the plurality of insulating particles;
   wherein the stabilized ink is in an insulating phase.

2. The stabilized ink of claim 1, wherein the polymer is an acrylate polymer.

3. The stabilizing ink of claim 2, wherein the acrylate polymer is a triacrylate polymer.

4. The stabilized ink of claim 2, wherein the acrylate polymer is trimethylolpropane ethoxylate triacrylate, urethane acrylate, epoxy acrylate, polyester acrylate, or any combination thereof.

5. The stabilized ink of claim 1, wherein the plurality of high aspect ratio stabilizing particles each have an aspect ratio of about 10:1 to about 20:1.

6. The stabilized ink of claim 1, wherein the plurality of high aspect ratio stabilizing particles each have an average particle diameter of about 0.8 to about 1.0 micrometers.

7. The stabilized ink of claim 1, wherein the plurality of high aspect ratio particles is boron nitride.

* * * * *